UNITED STATES PATENT OFFICE.

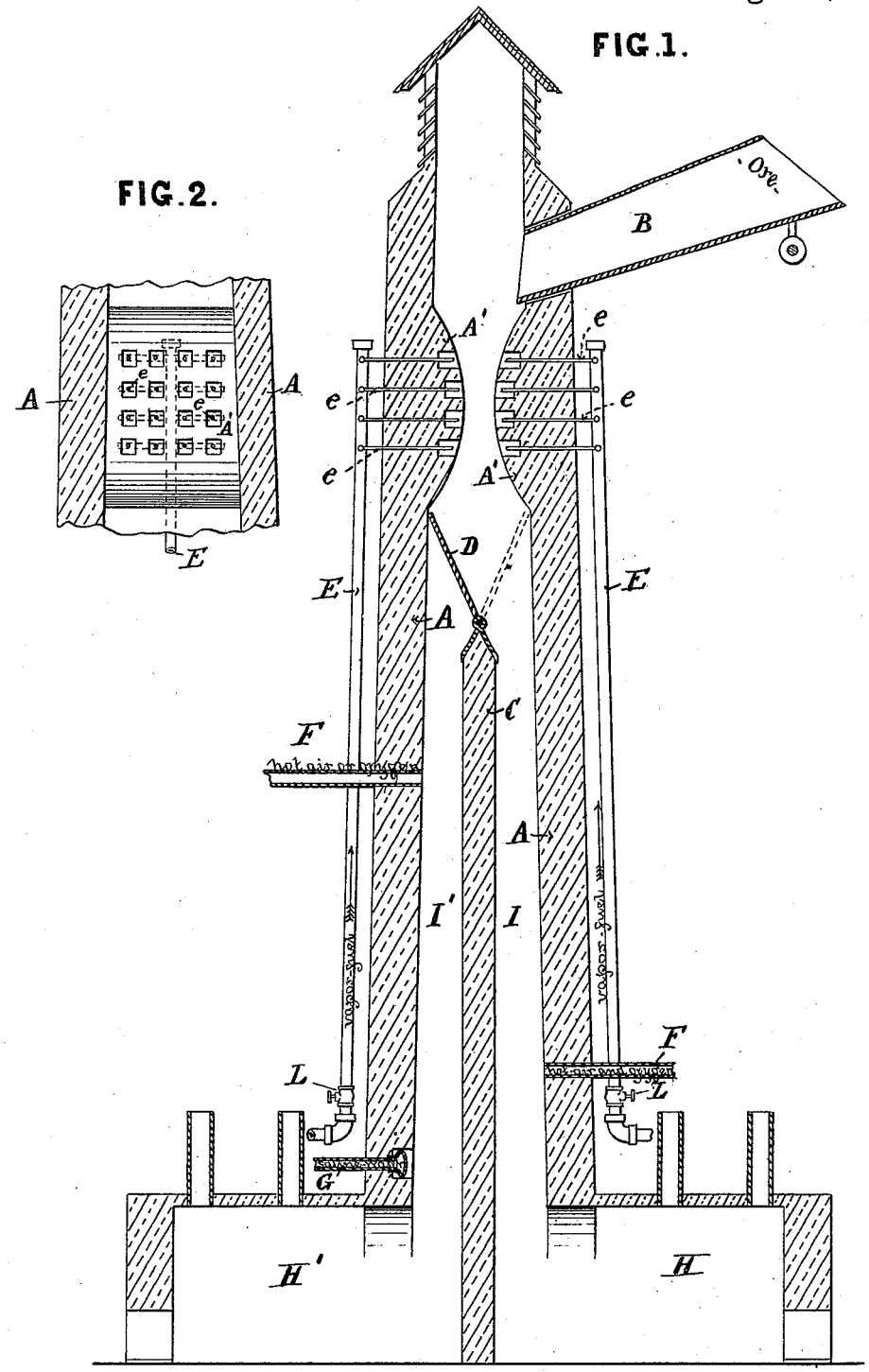

JULIO H. RAE, OF BOSTON, MASSACHUSETTS.

FURNACE FOR DESULPHURIZING AND OXIDIZING ORES.

SPECIFICATION forming part of Letters Patent No. 303,456, dated August 12, 1884.

Application filed February 20, 1884. (No model.)

*To all whom it may concern:*

Be it known that I, JULIO H. RAE, a citizen of the United States, residing at Boston, in the county of Suffolk and State of Massachusetts, have invented certain new and useful Improvements in Furnaces for Desulphurizing and Oxidizing Ores, of which the following is a specification.

My invention relates to an improvement in furnaces in which liquid fuel alone is used for desulphurizing ores, whereby the ore can be desulphurized or oxidized, and also desulphurized and chloridized, either, as may be required.

The invention consists in a peculiar construction of the walls of the furnace at the part where the flame enters, whereby the particles of ore passing down through the same will be successfully operated upon, vapor fuel or other gas or fuel being introduced in such a manner that each grain of the ore will be subjected to the action of the flame evolved from the vapor fuel. Hot air is also introduced, the oxygen of the air aiding in oxidizing the ore. I also provide for the introduction into the furnace of a spray of saturated saline water, to which the descending particles of ore are exposed, for the purpose of chloridizing the ore.

The upright furnace is composed of two separate chambers or compartments, between which is a central wall or partition extending upward to a point somewhat below the pipes, where the flames are generated, and having at its upper end a hinged or pivoted gate, which is made to close the entrance to either chamber, as required, and by which the falling ores can be guided to either chamber or side of the central partition, as desired.

Referring to the accompanying drawings, Figure 1 is a vertical section of a furnace embodying my invention. Fig. 2 represents the inner faces of the walls, from which the gas-jets protrude.

A A are the walls of the furnace, the space between which, near their upper portion, is contracted by swelling or increasing the thickness of the walls, as shown at A' A', the contracted space being about one-third of that of the main space, more or less, the object being to subject thoroughly each descending particle of ore to the action of the flame-jets issuing from each side of the contracted space.

B is a shaking-table or chute, from which the ore is fed to the furnace.

C is a central wall or partition extending from the bottom of the furnace upward to a point somewhat below the contracted portion of the furnace A' A', so as to constitute two separate chambers or compartments, I I', connecting, respectively, at their lower ends with the receptacles H H'. On the upper end of the partition C is hinged or pivoted a gate, D, capable of being swung to one side or the other, so as to close the opening to either chamber I I', as desired, and allowing the ore to pass down into one or the other, as required. Through the thicker or swelled portions A' A' of each main wall of the furnace, at the contracted space, is arranged a series of small metal pipes, $e$ $e$, as shown, and which connect with the outer pipes, E E, through which the vapor, gas, or other like fuel is conducted to the pipes $e$ $e$ from any suitable generating source. The supply-pipes E E are each provided near their lower ends, or it may be at any other suitable part, with a globe-valve or regulating-cock, L, for the purpose of regulating the supply of fuel, and thus increasing or decreasing the degree of heat of the flames, as required, according to the amount of sulphur contained in the ores.

F F are pipes passing through the walls of the furnace, for the purpose of supplying the same with hot air and oxygen.

At the lower end of the chamber I' is a pipe, G, passing through the wall, and provided at its inner end with a rose or perforated nozzle, through which saturated saline water in the form of spray is forced, for the purpose of chloridizing the particles of ore passing down through the chamber I'.

The operation is as follows: Fuel, being supplied through pipes E E to the small pipes $e$ $e$, is ignited, and jets of flame protrude in opposite directions in the contracted space of the furnace. The ore to be desulphurized is then fed from the shaking-table and falls through the contracted space, where it is subjected to the action of the jets of flame issuing from each side, so that every particle of the ore is equally acted upon. The gate D being in the position shown in full lines, the ore is conducted into the chamber I, where it is met by a current of hot air entering through pipe F, and is thereby oxidized, the ore then falling into the receptacle H, where it can remain for more perfect oxidation or be removed for further manipulation. When the ore is to be chloridized as well as desulphurized, the gate D is swung over to the position shown in dotted lines, and the ore is conducted into chamber I', where it is met by the hot air and oxygen entering through pipe F, as on the opposite side, and then comes in contact with the spray of saturated saline water passing from pipe G, whereby the ore becomes chloridized, and then drops into receptacle H'.

What I claim as my invention, and desire to secure by Letters Patent, is—

1. The combination of the walls A A, the contracted opening A' A', the vertical central wall, C, and the pivoted gate D, whereby the direction of the falling ore can be changed to either chamber I I', as desired.

2. In combination, the pipes E E, provided with regulating-valves, the pipes e e, and the upright furnace A, having the narrow opening A' A', for the purpose of supplying the vapor of liquid fuel to the furnace, and at the same time regulating the supply as occasion requires, substantially as set forth.

3. A furnace consisting of the upright walls A A, having the contracted passage A' A', the central vertical wall, C, the pivoted gate D, the air-tubes F F, the tube G, provided with the perforated nozzle, through which saturated saline water is to be forced, the pipes E E, provided with suitable valves or cocks, and the pipes e e, for the supply of the resultant of liquid fuel to the furnace, all so arranged and operating that the ore supplied to the furnace may be desulphurized or oxidized, and also desulphurized and chloridized, either, as may be required, substantially as shown and described.

In testimony whereof I have signed my name to this specification in the presence of two subscribing witnesses.

JULIO H. RAE.

Witnesses:
  J. H. ADAMS,
  J. H. HUNTINGTON.